United States Patent [19]
Gilbert

[11] Patent Number: 5,331,471
[45] Date of Patent: Jul. 19, 1994

[54] DISCRETE MIRROR DRIVE ASSEMBLY

[75] Inventor: Robert W. Gilbert, Lonsdale, Australia

[73] Assignee: Britax Rainsfords Pty Ltd, Lonsdale, Australia

[21] Appl. No.: 955,648

[22] Filed: Oct. 2, 1992

[30] Foreign Application Priority Data

Oct. 4, 1991 [AU] Australia ............................ PK 8719

[51] Int. Cl.⁵ .......................... G02B 7/182; B60R 1/06
[52] U.S. Cl. ................................... 359/874; 359/872; 359/873; 359/877; 248/479
[58] Field of Search ............... 359/872, 874, 877, 873, 359/876; 248/476, 477, 479, 485, 487; 439/34; 174/50, 52.1, 65 R

[56] References Cited

U.S. PATENT DOCUMENTS

| 4,403,829 | 9/1983 | Thujiuchi et al. | 359/874 |
| 4,482,211 | 11/1984 | Fisher | 359/877 |
| 4,498,738 | 2/1985 | Kumai | 359/877 |
| 4,598,605 | 7/1986 | Manzoni | 74/501 |
| 4,815,837 | 3/1989 | Kikuchi et al | 359/874 |
| 4,881,418 | 11/1989 | Fineri | 74/89.14 |

Primary Examiner—Loha Ben
Assistant Examiner—Darryl J. Collins
Attorney, Agent, or Firm—Harness, Dickey & Pierce

[57] ABSTRACT

A rear view mirror assembly is disclosed which incorporates an improved drive system utilizing electric servo motors for positioning of the mirror. The improved drive system includes a two piece housing within which a jacking nut is rotatably positioned and adapted to be driven by the electric motors. A resilient coupling is provided to retain the two piece housing in assembled relationship. The drive system is designed to be used with a wide variety of mirror designs.

16 Claims, 3 Drawing Sheets

DISCRETE MIRROR DRIVE ASSEMBLY

BACKGROUND AND SUMMARY OF THE INVENTION

This invention relates to a drive system for rear view mirrors in which the mirror position is adjusted using electric servo motors.

Such drive assemblies normally comprise a projecting jacking screw which is pivotally coupled to the rear surface of a mirror so as to effect angular movement of the mirror. An electric motor, via gearing which normally comprises a worm gear driving a spur wheel or jacking nut is used to move the jacking screw with respect to the drive assembly so as to adjust the orientation of the mirror. Normally, the jacking screw is threadably journalled with respect to the jacking nut, and forward or reverse operation of a motor will move the jacking screw in or out.

The mirror is normally pivotally coupled to a mounting plate via a ball and socket joint. Due to the geometry of such an arrangement, as the jacking screw moves in and out, there is always some small angular movement about an axis normal to the longitudinal axis of the jacking screw.

In order to allow for this axial movement, in a previous patent application (Australian Patent No. 602373 and U.S. Pat. No. 4,881,418) provides a means whereby both the jacking screw and jacking nut may rotate about an axis which is normal to their longitudinal axis. In the aforementioned patent application, the jacking nut is provided with an upper and lower spherical bearing surface which is journalled between respective upper and lower bearing surfaces. This allows axial movement of both the jacking nut and jacking screw. However one of the problems with this particular design is the careful control that must be exercised when assembling the various components to ensure that the jacking nut can freely move, while at the same time not being so loose so as to allow movement or vibration of the mirror surface.

In the previous abovementioned patent, this problem was overcome by one of the bearing surfaces comprising a spring member which ensured that, regardless of variation in manufacturing and assembly tolerances, a constant tension was applied to the jacking nut which was sufficient to prevent movement or vibration, while at the same time being free enough to allow the jacking nut to rotate.

In this previous specification, the drive assembly comprises a cover within which the electric motor was secured, and which provided a first bearing surface for the jacking nut, the upper bearing surface comprised a pressed metal component or spring member having resilient arms thereon, which was then placed on top of the jacking nut. This cover subassembly was then secured to a mounting plate and the resilient arms of the spring member abutted against the mounting plate surface thereby providing sufficient tension to securely hold the jacking nut.

Although this particular assembly proved to be quite satisfactory, the cover unit which normally housed two electric motors and associated drive mechanisms was a component that had to be individually designed for each particular mirror.

Therefore, it is an object of this invention to provide a discrete drive assembly which has a system of mounting which allows the one drive assembly to be used in any number of different mirror designs and configurations.

It is a further object of this invention to provide an improved means of pretensioning the bearing surfaces between which the jacking nut is journalled for rotation which is easier to assemble and of a simpler nature than the invention described in the earlier aforementioned patent application.

A further problem associated with the earlier drive assembly occurred when there was overrun of the electric motor. In this particular configuration, when the jacking screw was being retracted, if the motor was allowed to continue to run, then the mirror would eventually come against a stop, which resulted in the jacking nut being lifted upwardly against the spring member. Due to the design of the spring, when overrun occurred, the jacking nut could actually lift quite appreciably, such that the worm drive might become disengaged, and jamming of the jacking nut against the worm drive might occur.

In order to overcome this problem, the stiffness of the spring member was increased. Although this overcame the movement of the jacking nut, it also had the effect of increasing the load applied to the bearing surfaces which again increased the power requirement from the motor, and a higher more costly electric motor was required.

Therefore, it is a further object of this invention to overcome the abovementioned problem, and to provide a means whereby the jacking nut bearing surfaces are resiliently held together, while at the same time avoiding disengagement of the worm drive from the jacking nut should there be deformation of the resilient coupling means.

In its broadest form, the invention comprises a discrete drive assembly for a rear view mirror having a projecting jacking screw which is pivotally coupled to the rear surface of a mirror to effect angular movement of the mirror and an electric motor for effecting variation in the extent of protrusion of the jacking screw so as to adjust the orientation of the mirror, the discrete drive assembly comprising a housing formed in two parts comprising a base and a cover a first bearing surface formed on the inner surface of the base a second bearing surface formed on the inner surface of the cover which aligns with the first bearing surface when the base and cover are assembled together, a jacking nut positioned between the first and second bearing surfaces which is rotated by the electric motor for operating the jacking screw, the relative dimensions of the base, cover and jacking nut being such that there is clearance between the base and cover to permit the first and second bearing surfaces to abut against the jacking nut, and resilient coupling means holding the base and cover together with a force allowing the jacking nut to rotate relative to the first and second bearing surfaces.

Preferably, the resilient coupling means comprises a leaf spring having each end coupled to the base with an intermediate portion bearing against the cover so as to urge the two parts of the housing together.

The base of the discrete drive assembly may be provided with a securing means which is adapted to fix the base with respect to a mounting plate of a rear view mirror assembly. Preferably, the mounting plate is provided with a formed recess or aperture within which the discrete drive assembly is located. The securing means may comprise a plurality of tabs depending from the base with apertures therein, and the mounting plate may be provided with projections which engage the tabs. The projections may surround the aperture or recess into which the discrete drive assembly locates, and the tabs may be resiliently deformable such that upon insertion of the discrete drive assembly into the aperture or recess, the tabs bend away from the projections thereby allowing the projections to engage the apertures within the tab.

The aperture or recess in the mounting plate will be designed so as to prevent lateral movement of the discrete drive assembly within the plane of the mounting plate, and the clips may be designed so as to securely hold the discrete drive assembly with respect to the mounting plate.

The base may comprise a substantially planar element having clips which depend therefrom, and the cover may comprise a base portion with a peripheral side wall wherein the motor is secured to the cover. The cover may be provided with engagement means which are engaged by the clips, and the clips and engagement means may be designed so as to prevent the two parts of the housing separating while at the same time allowing some relative movement between the base and the cover.

Allowing relative movement between the base and cover is desirable, as it enables the first and second bearing surfaces to abut against the jacking nut while providing for a clearance between the base and cover. By providing for a small amount of relative movement between the engagement means and clips, a greater allowance in manufacturing tolerance can be accommodated. However, by allowing for some relative movement, the base and cover may be forced apart in the case of the motor being allowed to overrun.

Should this separation occur, which in this arrangement will be as the jacking screw is moving outwardly, then the clip and engagement means between the base and cover will allow some separation of these two parts. However, as the electric motor and the jacking nut are fixed with respect to the cover, the jacking nut cannot become disengaged from the worm drive of the electric motor. Accordingly, a much lighter resilient coupling means may be used to hold the cover to the base which therefore results in less friction between the first and second bearing surfaces and the jacking nut. This therefore means that less power is required from the motor, which might either increase the life of the motor or allow a much cheaper electric motor to be used.

BRIEF DESCRIPTION OF THE DRAWINGS

In order that the invention will be readily understood, a preferred embodiment will now be described, however it should be realised that the invention is not to be confined or restricted to the precise details of this embodiment. The embodiment is illustrated in the accompanying drawings in which.

DESCRIPTION OF THE PREFERRED EMBODIMENT

Figure 3:
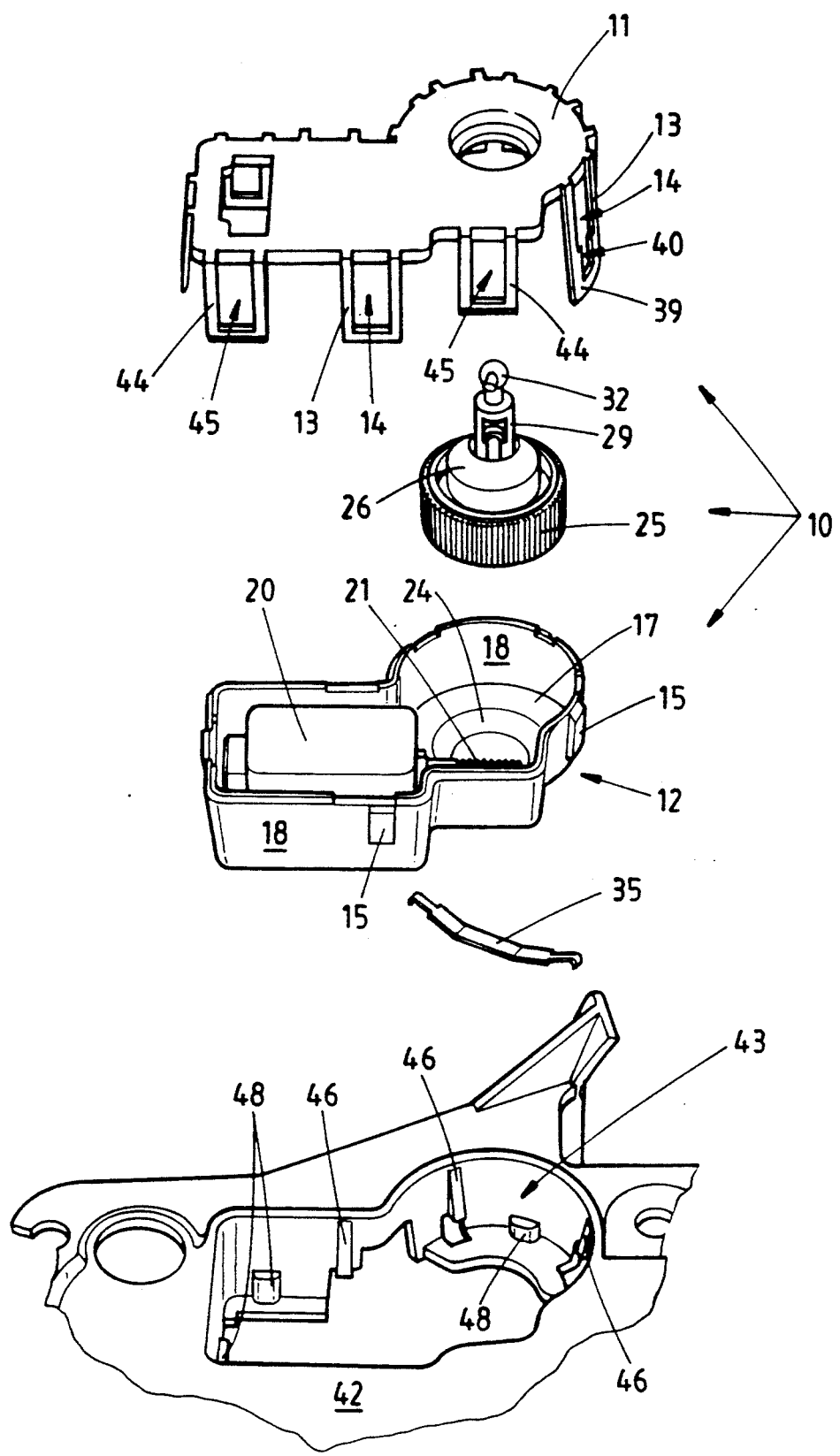
FIG. 3 shows an "exploded" view of a discrete drive assembly and mounting plate.

As can be seen in FIG. 3, the discrete drive assembly 10 comprises a base 11 and a cover 12 which are retained together by clips and engagement means. In this embodiment each clip 13 comprises a tab-like member that depend from the base 11 and have an aperture 14 therein. The engagement means comprises projections 15 on the cover 12 which engage within the apertures 14 of the clips 13.

The apertures 14 and projections 15 are sized so as to allow some degree of relative movement between the base 11 and cover 12 when they are assembled so that the variations in component sizes can be accommodated. When assembling the cover 12 to the base 11, the clips 13 deflect outwardly so as to allow the projections 15 to locate within the apertures 14.

The cover 12 comprises a bottom wall 17 and a side wall 18. The projections 15 are moulded on the side wall 18 of the cover 12.

The electric motor 20 is securely fixed within the cover 12, and is provided with a worm screw 21 at the drive output end.

Figure 5:
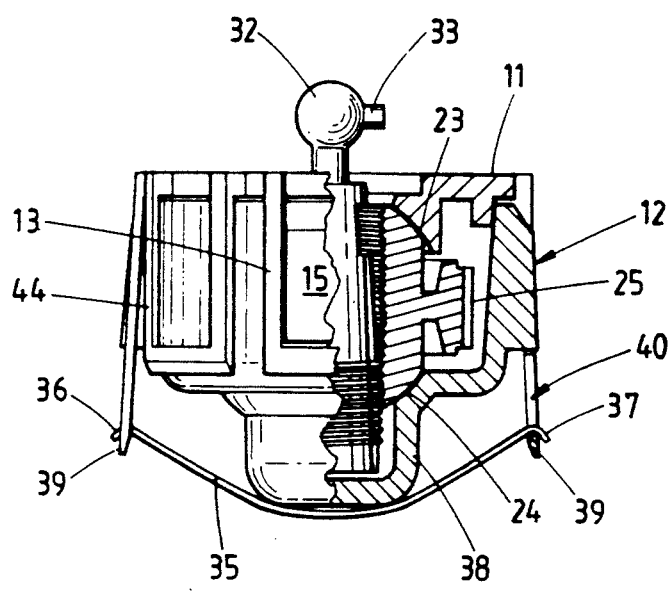
FIG. 5 shows a part cross-sectional view of a discrete drive assembly about the section line 5—5 shown in FIG. 1.

Referring to FIG. 5, a first bearing surface 23 is moulded into the base 11, and a second bearing surface 24 is moulded into the cover 12. When the base 11 and cover 12 are assembled, both the first and second bearing surfaces 23 and 24 align, and a jacking nut is positioned between the bearing surfaces 23 and 24.

Figure 4:
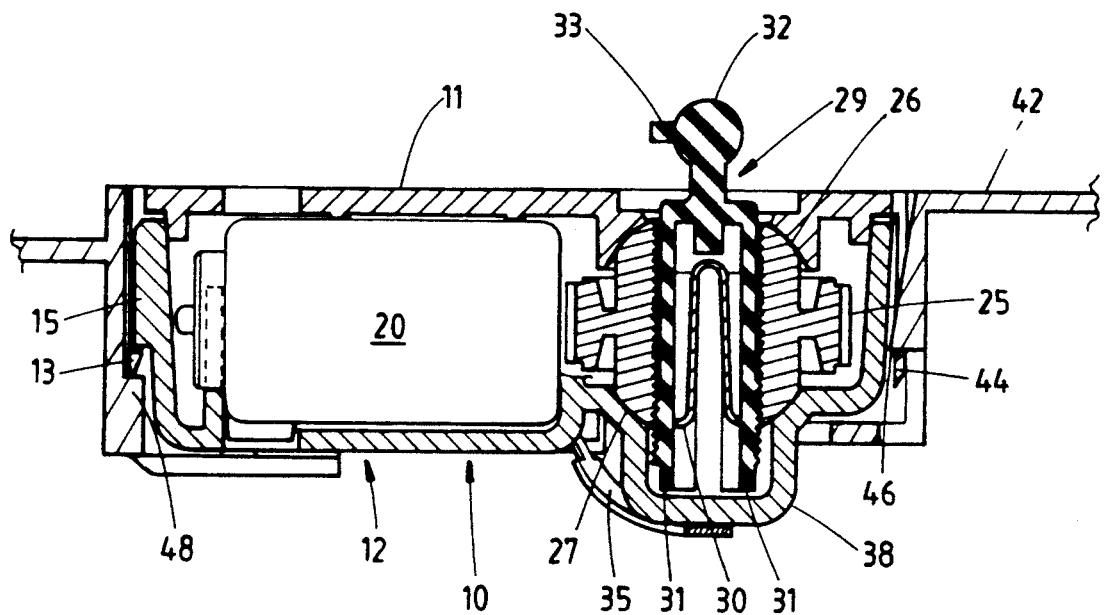
FIG. 4 shows a cross-sectional view of a discrete drive assembly located in a mounting plate along section line 4—4 shown in FIG. 1.

As can be seen in FIG. 4, the jacking nut 25 is provided with upper and lower bearing surfaces 26 and 27, and all bearing surfaces 23 and 24 and 26 and 27 are spherical. When the jacking nut 25 is assembled between the first and second bearing surfaces 23 and 24, a clearance remains between the side wall 18 of the cover 12 and the base 11 as is shown in FIGS. 4 and 5.

A jacking screw 29 is journalled for rotation within the jacking nut 25. The jacking screw 29 is bifurcate, and contains a spring 30 which spreads the bifurcate legs 31. The lower ends of the bifurcate legs 31 has a portion of screw thread thereon which threadably engages with the threaded bore of the jacking nut 25. The bifurcate nature of the jacking screw 29 enables the legs 31 to bend inwardly thereby disengaging the threads. This will occur when the jacking screw 29 reaches the limit of its movement at either end of the jacking nut 25.

The upper end of the jacking screw 29 is provided with a ball head 32 which is an outstanding spigot 33 thereon. The ball head 32 engages the back of the mirror 34, and allows for rotation of the jacking screw 29 with respect to the mirror 34, while the spigot 33 prevents rotation of the ball head 32 about the longitudinal axis of the jacking screw 29.

In order to ensure that the first and second bearing surfaces 23 and 24 are securely abutting against the jacking nut 25, a resilient coupling means is provided which urges the base 11 and cover 12 together. In this embodiment, the resilient coupling means comprises a leaf spring 35 which has both ends 36 and 37 secured with respect to the base 11, and a projection 38 which is moulded into the cover 12 bears against an intermediate portion of the leaf spring 35. Two posts 39 extend downwardly from the base 11, either side of the cover 12. As can be seen, the posts 39 are splayed outwardly slightly, and are provided with apertures 40 which enable engagement of the ends 36 and 37 of the leaf spring 35.

The leaf spring 35 is elastically deformed when its ends 36 and 37 are located within the apertures 40. The resultant force causes the cover 12 to be urged toward the base 11. The leaf spring 35 tension can be adjusted so as to provide the necessary force to urge the base 11 and cover 12 together, while at the same time allowing free rotation of the jacking nut 25.

As mentioned previously, the apertures 14 and projections 15 associated with the clips 13 and cover 12 respectively, are sized so as to allow relative movement between the base 11 and cover 12. This movement is limited to the base 11 and cover 12 either moving together or apart along the axis of the jacking screw 29. One advantage of the invention is to allow large tolerances of manufacture in relation to the various components, and for example, if the dimension between the upper and lower bearing surfaces 26 and 27 of the jacking nut 25 is at its minimum, the relative movement which is provided for between the base 11 and cover 12 will ensure that the first and second bearing surfaces 23 and 24 are still able to engage the jacking nut 25 while maintaining a clearance between the base 11 and cover 12.

Conversely, if the aforesaid dimension of the jacking nut 25 was at its upper limit, the degree of relative movement between the base 11 and cover 12 would still allow correct assembly.

This range of movement can be simply allowed for by ensuring that the length of the aperture 14 is greater than the length of the projection 15. It will be realised that the range of movement will depend upon the cumulative tolerances between the various components of the assembly 10.

However, by allowing this range of movement, then there will be circumstances where the cover 12 is forced away from the base 11. Primarily, this occurs when the jacking screw 29 continues to be driven outwardly to the point where the mirror 34 comes against a stop. If the electric motor 20 continues to run, then the jacking screw 29 will cause a downward force to be applied to the second bearing surface 24 via the lower bearing surface 27 of the jacking nut 25, thereby forcing the cover 12 away from the base 11 via flexing of the leaf spring 35.

When the cover 12 is forced away from the base 11, the projection 38 bears against the leaf spring 35, which in turn pulls the posts 39 together. Therefore, this movement is initially resisted by the leaf spring 35, but if the force resulting from the electric motor 20 overrun is sufficient, then deformation of the leaf spring 35 will occur.

However, if this separation between the base 11 and cover 12 does occur, the jacking nut 25 will remain firmly seated against the second bearing surface 24, and as the electric motor 20 is secured to the cover 12, then the worm screw 21 cannot become disengaged from the jacking nut 25. Similarly, if the jacking screw 29 were to lift the jacking nut 25 upwardly, then it would bear against the first bearing surface 23, which again would not result in any relative movement between the worm drive 21 and the jacking screw 25.

Figure 1:
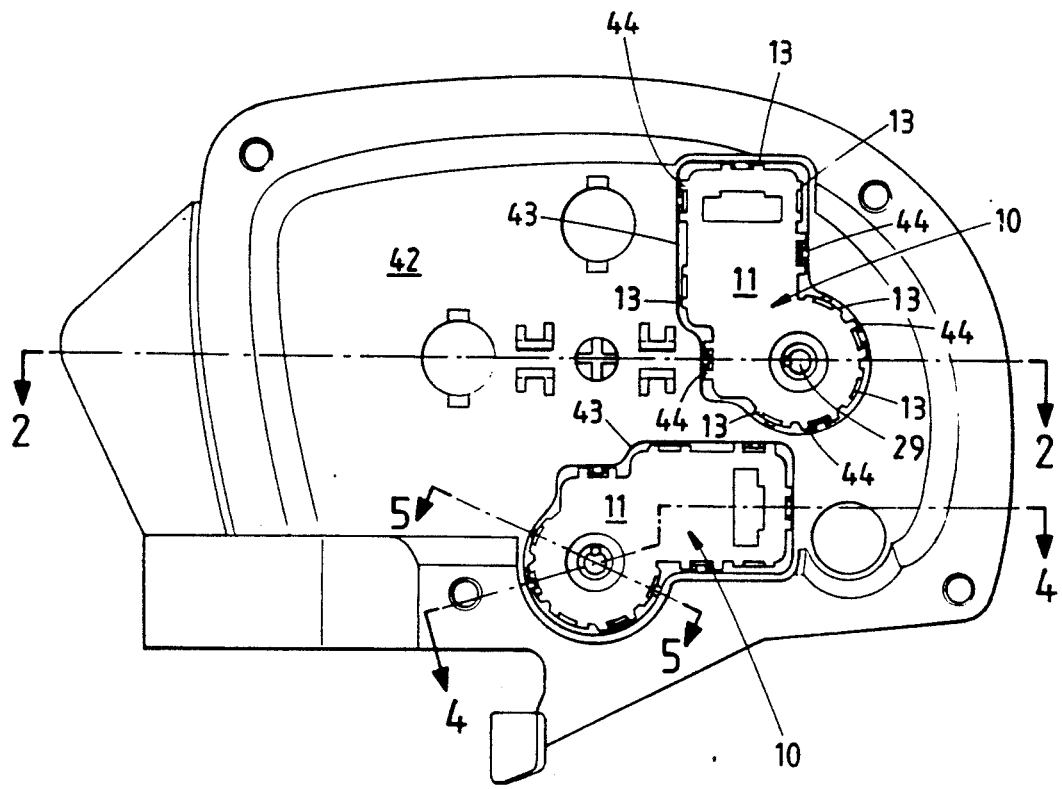
FIG. 1 shows a plan view of a mounting plate with two discrete drive assemblies installed in the mounting plate.
Figure 2:
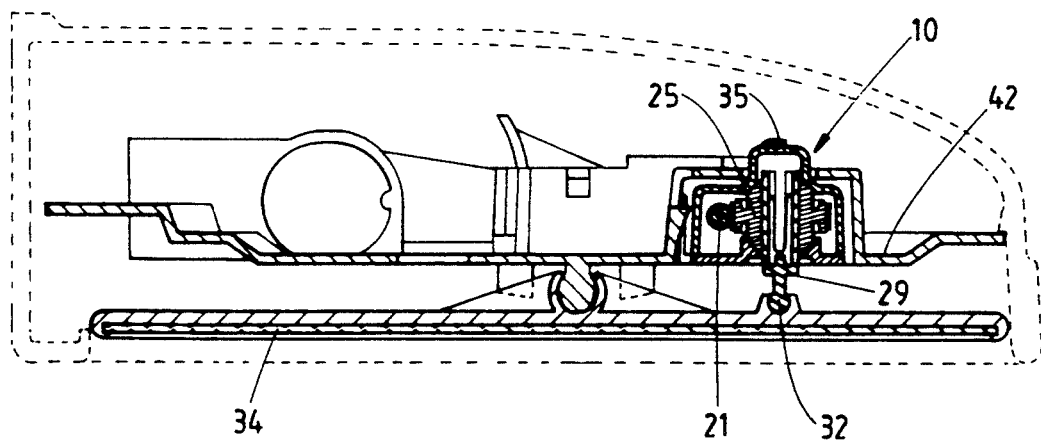
FIG. 2 shows a cross-section of a mounting plate and rear view mirror assembly along section line 2—2 shown in FIG. 1.

To ensure maximum versatility, the discrete drive assembly 10 may be arranged so as to be readily securable to a mounting plate of a rear view mirror assembly which is shown in FIGS. 1, 2 and 3. This will enable the discrete drive assembly 10 to be utilised in any mirror design regardless of the overall design of the rear view mirror assembly.

Accordingly, a mounting plate 42 is provided with a pair of recesses 43 which allow for mounting of the discrete drive assembly 10 within the recesses 43. In order to secure the discrete drive assembly 10 with respect to the mounting plate 42, the base 11 is provided with a plurality of tabs 44. The tabs 44 are positioned between the clips 13 and are spaced a small distance from the side wall 18 of the cover 12. The tabs 44 are provided with apertures 45, and the mounting plate 42 is provided with tapered projections 46 which engage within the apertures 45.

Upon inserting a discrete drive assembly 10 within a recess 43, the tabs 44 bend inwardly over the tapered projections 46, until the projections are allowed to engage within the apertures 45. The tabs 44 which are spaced around the periphery of the base 11 restrain any lateral movement of the discrete drive assembly 10 with respect to the planar surface of the mounting plate 42. The ends of each clip 13 abut against shouldered portions 48 so as to restrain any significant movement of the base 11 with respect to the mounting plate 42 along the axis of the jacking screw 29.

Such securing means provides a simple and easy means of mounting the discrete drive assembly 10 to a mounting plate 42, and obviously allow a similar recess 43 and securing means to be used on the mounting plate 42 of various mirrors. Therefore, only a single drive assembly need be constructed for a variety of mirror designs.

I claim:

1. A discrete drive assembly for a rear view mirror having a projecting jacking screw which is pivotally coupled to the rear surface of a mirror to effect angular movement of the mirror and an electric motor for effecting variation in the extent of protrusion of the jacking screw so as to adjust the orientation of the mirror, the discrete drive assembly comprising:
   a housing formed in two parts comprising a base and a cover;
   a first bearing surface formed on the inner surface of the base;
   a second bearing surface formed on the inner surface of the cover which aligns with the first bearing surface when the base and cover are assembled together;
   a jacking nut positioned between the first and second bearing surfaces which is rotated by the electric motor for operating the jacking screw, the relative dimensions of the base, cover and jacking nut being such that there is clearance between the base and cover to permit the first and second bearing surfaces to abut against the jacking nut; and
   resilient coupling means holding the base and cover together with a force allowing the jacking nut to rotate relative to the first and second bearing surfaces, said resilient coupling means comprising a leaf spring having each end coupled to the base with an intermediate portion bearing against the cover so as to urge the two parts of the housing together.

2. A discrete drive assembly according to claim 1 wherein two posts extend from the base either side of the axis of rotation of the jacking nut, the posts having apertures therein, the leaf spring being elastically deformed such that the ends of the leaf spring locate within the apertures, and an intermediate portion bears against the cover, forcing it toward the base.

3. A discrete drive assembly according to claim 2 wherein the base comprises a substantially planar element having a plurality of clips depending therefrom, and the cover comprises a bottom wall with a side wall around the periphery of the bottom wall, and a plurality of engagement means on the side wall which are engaged by the clips, the clips and the engagement means being arranged to prevent the two parts of the housing separating, but allowing relative movement between the base and the cover.

4. A discrete drive assembly according to claim 3 wherein the clips comprise a tab having an aperture therein, and the engagement means comprises a projection on the peripheral side wall of the cover, the tabs being resilient so as to allow outward deflection and engagement of the projections as the cover and base are being assembled, the projections being smaller than the apertures, so as to allow relative movement between the base and cover along the axis of the jacking screw.

5. A discrete drive assembly according to claim 3 wherein the electric motor is secured with respect to the cover.

6. A discrete drive assembly according to claim 5 further comprising securing means adapted to fix the base with respect to a mounting plate of a rear view mirror assembly.

7. A discrete drive assembly according to claim 3 further comprising securing means adapted to fix the base with respect to a mounting plate of a rear view mirror assembly.

8. A discrete drive assembly according to claim 1 further comprising securing means adapted to fix the base with respect to a mounting plate of a rear view mirror assembly.

9. A discrete drive assembly for a rear view mirror having a projecting jacking screw which is pivotally coupled to the rear surface of a mirror to effect angular movement of the mirror and an electric motor for effecting variation in the extent of protrusion of the jacking screw so as to adjust the orientation of the mirror, the discrete drive assembly comprising:
 a housing base comprising a substantially planar element having a plurality of clips depending therefrom;
 a housing cover comprising a bottom wall with a side wall around the periphery of the bottom wall, and a plurality of engagement means on the side wall which are engaged by the clips, the clips and the engagement means being arranged to prevent the housing base separating from the housing cover but allowing relative movement between the base and the cover;
 a first bearing surface formed on the inner surface of the base;
 a second bearing surface formed on the inner surface of the cover which aligns with the first bearing surface when the base and cover are assembled together;
 a jacking nut positioned between the first and second bearing surfaces which is rotated by the electric motor for operating the jacking screw, the relative dimensions of the base, cover and jacking nut being such that there is clearance between the base and cover to permit the first and second bearing surfaces to abut against the jacking nut; and
 resilient coupling means holding the housing base and housing cover together with a force allowing the jacking nut to rotate relative to the first and second bearing surfaces.

10. A discrete drive assembly according to claim 9 wherein the electric motor is secured with respect to the cover.

11. A discrete drive assembly according to claim 9 further comprising securing means adapted to fix the base with respect to a mounting plate of a rear view mirror assembly.

12. A discrete drive assembly according to claim 9 wherein the electric motor is secured with respect to the cover.

13. A discrete drive assembly according to claim 9 further comprising securing means adapted to fix the base with respect to a mounting plate of a rear view mirror assembly.

14. A discrete drive assembly for a rear view mirror having a projecting jacking screw which is pivotally coupled to the rear surface of a mirror to effect angular movement of the mirror and an electric motor for effecting variation in the extent of protrusion of the jacking screw so as to adjust the orientation of the mirror, the discrete drive assembly comprising:
 a housing base comprising a substantially planar element having a plurality of clips depending therefrom, each clip comprising a tab having an aperture therein;
 a housing cover comprising a bottom wall with a side wall around the periphery of the bottom wall, and a plurality of projections on the peripheral side wall of the cover, which are engaged by the clips, the clips and the projections being arranged to prevent the housing base separating from the housing cover, and the tabs being resilient so as to allow outward deflection and engagement of the projections as the cover and base are being assembled, the projections being smaller than the apertures, so as to allow relative movement between the base and cover along the axis of the jacking screw;
 a first bearing surface formed on the inner surface of the base;
 a second bearing surface formed on the inner surface of the cover which aligns with the first bearing surface when the base and cover are assembled together;
 a jacking nut positioned between the first and second bearing surfaces which is rotated by the electric motor for operating the jacking screw, the relative dimensions of the base, cover and jacking nut being such that there is clearance between the base and cover to permit the first and second bearing surfaces to abut against the jacking nut; and
 resilient coupling means holding the base and cover together with a force allowing the jacking nut to rotate relative to the first and second bearing surfaces.

15. A discrete drive assembly for a rear view mirror having a projecting jacking screw which is pivotally coupled to the rear surface of a mirror to effect angular movement of the mirror and an electric motor for effecting variation in the extent of protrusion of the jacking screw so as to adjust the orientation of the mirror, the discrete drive assembly comprising:
 a housing formed in two parts comprising a base and a cover;

a first bearing surface formed on the inner surface of the base;

a second bearing surface formed on the inner surface of the cover which aligns with the first bearing surface when the base and cover are assembled together;

a jacking nut positioned between the first and second bearing surfaces which is rotated by the electric motor for operating the jacking screw, the relative dimensions of the base, cover and jacking nut being such that there is clearance between the base and cover to permit the first and second bearing surfaces to abut against the jacking nut;

resilient coupling means holding the base and cover together with a force allowing the jacking nut to rotate relative to the first and second bearing surfaces; and securing means including a plurality of tabs with apertures therein, and a plurality of tapered projections on the mounting plate which engage within the apertures so as to hold the base with respect to the mounting plate of a rear view mirror assembly.

16. A discrete drive assembly according to claim 15 wherein the tabs are spaced from the peripheral side wall of the cover.

* * * * *